Dec. 22, 1931.  P. R. KAUFFMAN  1,837,446
HYDRAULIC BRAKE
Filed April 10, 1929    4 Sheets-Sheet 1
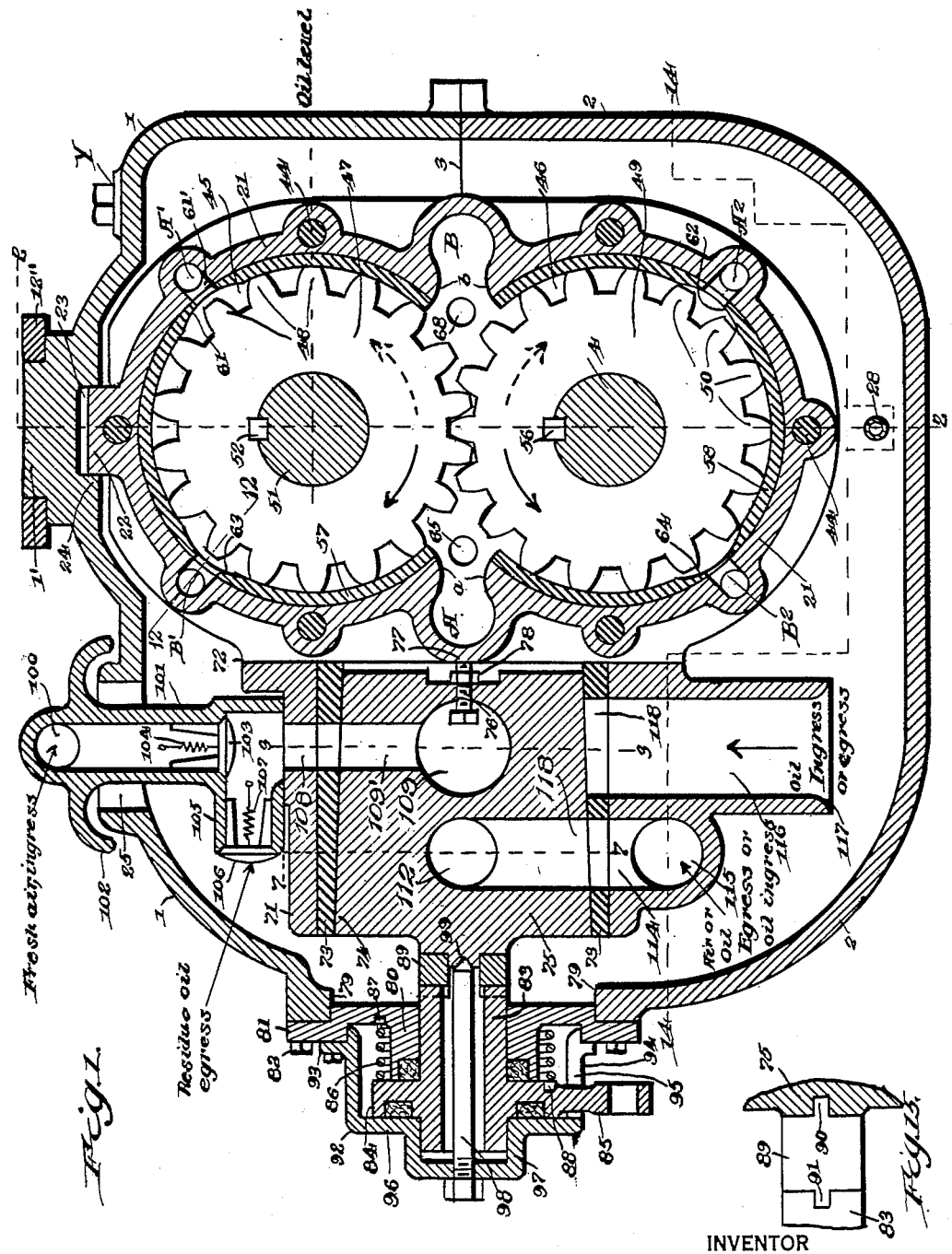
INVENTOR
Paul R. Kauffman
BY
Carl H. Crawford
ATTORNEY Dec. 22, 1931.  P. R. KAUFFMAN  1,837,446
HYDRAULIC BRAKE
Filed April 10, 1929  4 Sheets-Sheet 2
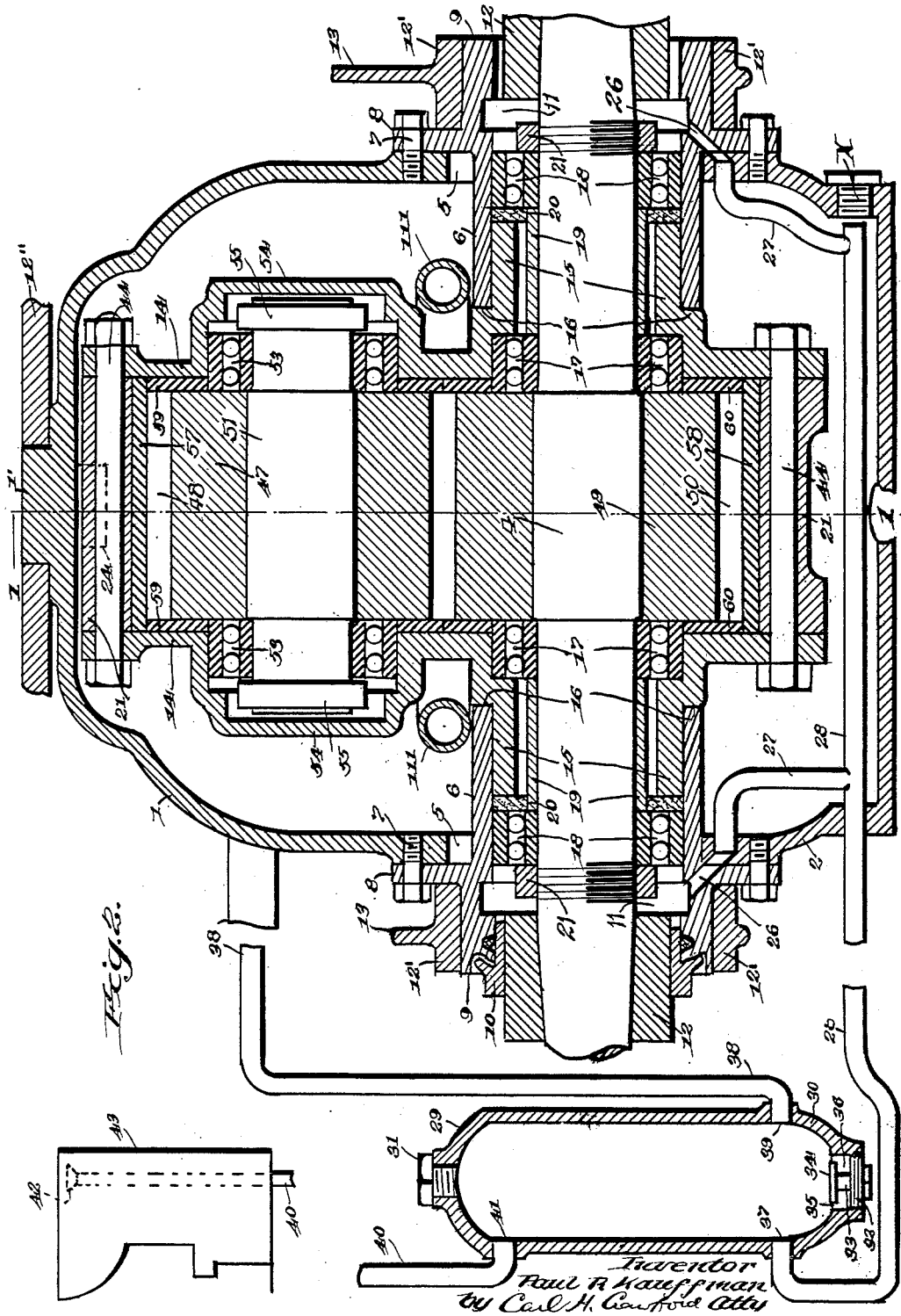

Dec. 22, 1931.   P. R. KAUFFMAN   1,837,446
HYDRAULIC BRAKE
Filed April 10, 1929   4 Sheets-Sheet 3
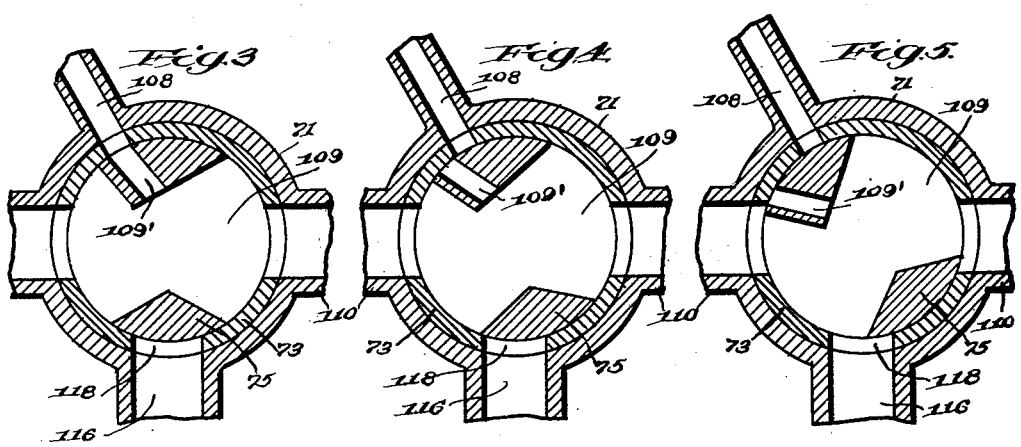
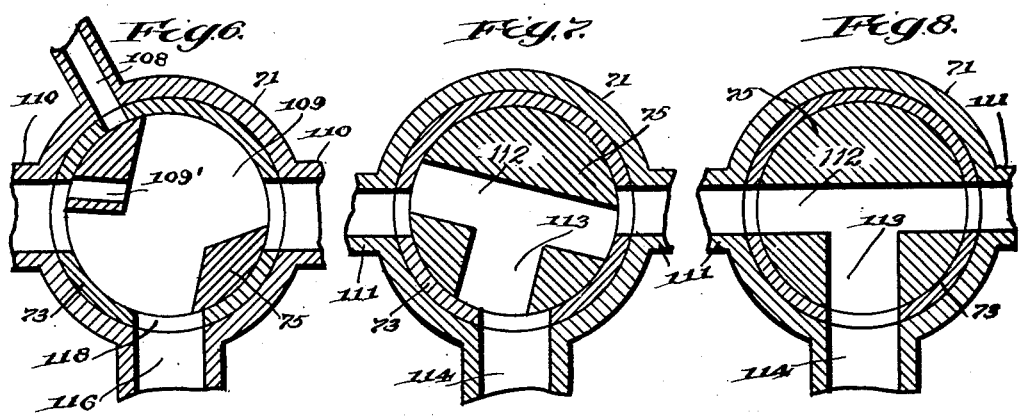
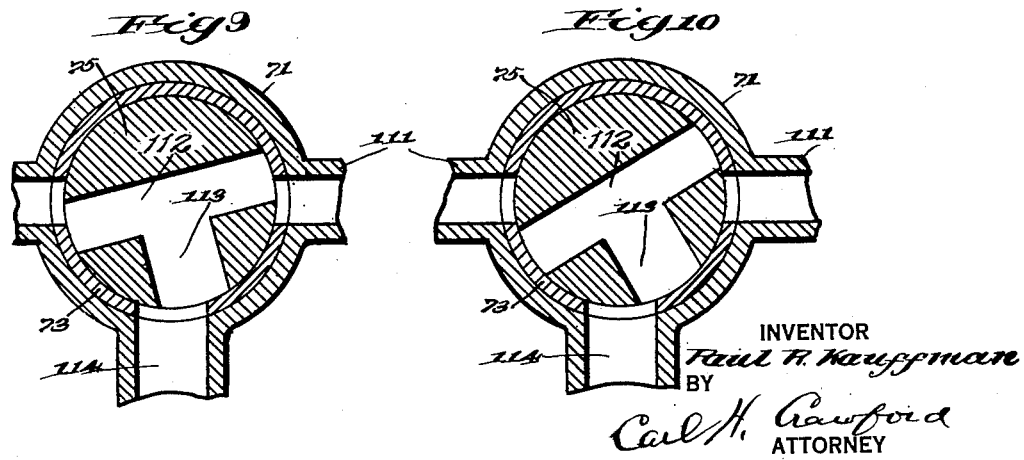
INVENTOR
Paul R. Kauffman
BY
Carl H. Crawford
ATTORNEY

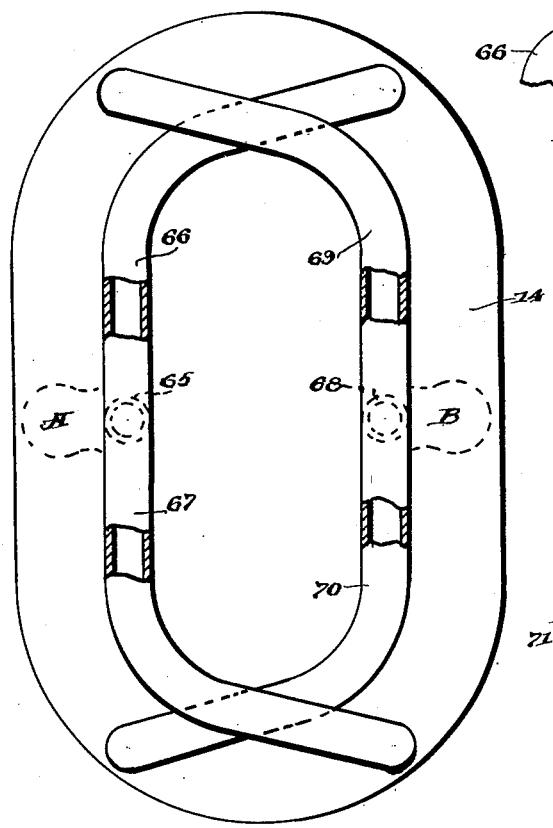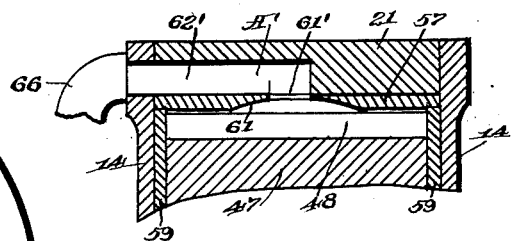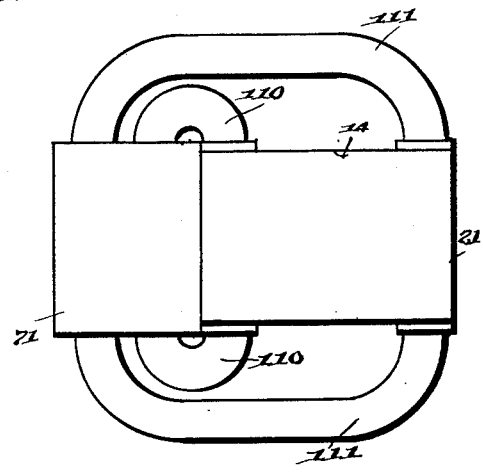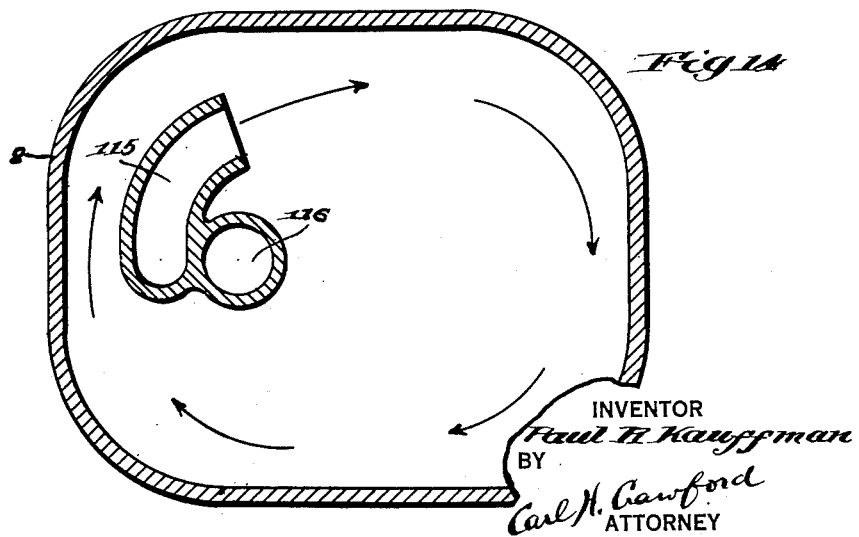

Patented Dec. 22, 1931

1,837,446

UNITED STATES PATENT OFFICE

PAUL R. KAUFFMAN, OF SEATTLE, WASHINGTON, ASSIGNOR TO McCLEARY HYDRAULIC BRAKE COMPANY, OF SEATTLE, WASHINGTON, A CORPORATION OF WASHINGTON

HYDRAULIC BRAKE

Application filed April 10, 1929. Serial No. 354,104.

This invention relates to improvements in vehicular hydraulic brakes of that type in which vehicle driven members act upon a fluid, such as oil, to apply brakeage.

One of the features of the present invention is to afford the interior portions of the brake an effective cooling medium when no braking function is being performed, and in the present embodiment, such cooling medium is in the form of fresh air that continuously passes into and through the apparatus from, and back to, the outer air.

This feature is rendered highly effective in this invention by reason of the fact that the vehicle driven members act upon the fresh air to positively propel the same through the path of travel provided therefor.

It is a further feature of the invention to also cause such cooling medium to impinge and penetrate the oil body to reduce the temperature thereof, and in the most preferred construction, this feature is embodied in a novel form such as will cause the entering fresh air to set the oil body into motion of a character that will most effectively bring the entire oil body into cooling relation with the air.

It is a feature of the invention to provide an outer enclosure which will be termed a housing, in which the oil body is adapted to be disposed, and to mount in said housing a brake casing, containing the braking mechanism, and to normally keep the brake casing out of communication with the interior of the housing except when a valve means is adjusted into a braking or non-braking adjustment. In other words, the brake casing itself, is closed to the interior of the housing.

A feature of this invention consists in a novel form of means, preferably, a valve means, whereby both the air and oil are positively controlled as regards admission to the brake mechanism proper.

A further feature consists in novel endless connections between the valve means and the brake mechanism both for the air and oil which not only serve to insure an adequate supply, but which in the event of oil admission, also serve to balance the reacting pressures on the valve in a manner to permit easy and free adjustment of the latter.

The invention also involves a novel means whereby the pressure built up incident to the application of brakeage is utilized to balance the vehicle driven members or gears in an equilibrium of pressure thereby relieving the journals and bearings of such gears from any disrupting strains and permitting them to rotate freely under nothing more than balanced stresses that they are clearly capable of sustaining.

This invention has many other features and objects which will be more fully described in connection with the accompanying drawings and which will be more particularly pointed out in and by the appended claims.

In the drawings:—

Fig. 1 is a vertical sectional view of the apparatus taken on line 1—1 of Fig. 2.

Fig. 2 is a vertical sectional view taken on line 2—2 of Fig. 1.

Fig. 3 is a sectional view on line 3—3 of Fig. 1, showing the controlling valve in an oil shut-off non-braking adjustment with full air ingress to the valve and full air egress through endless connections to the brake casing.

Fig. 4 is a section similar to Fig. 3, with the valve advanced to shut off air ingress but still closing oil ingress and thereby causing the gears to build up an air vacuum.

Fig. 5 is a similar section with the valve advanced to open oil ingress thereto and close air ingress and with the connection to the brake casing open.

Fig. 6 is a similar section with air ingress closed and oil ingress further opened and with open delivery for the oil toward the brake casing.

Fig. 7 is a sectional view on line 7—7 of Fig. 1, showing the oil portion of the controlling valve in the position it would occupy when the air portion is in the Fig. 3, position, and is thus a companion view to Fig. 3, showing ports open for passage of air from the brake casing.

Fig. 8 is a sectional view similar to Fig. 7, and is a companion view to Fig. 4, showing full open portage registry.

Fig. 9 is a sectional view similar to Fig. 7, with the valve further advanced and illustrating a partial cut-off of air egress, this view being a companion view to Fig. 5.

Fig. 10 is a sectional view similar to Fig. 7, with the valve still further advanced to a shut-off position and in a companion position to Fig. 6.

Fig. 11 is a semi-diagrammatic view in side elevation of the brake casing showing certain connections from the pressure of generating chambers to the balancing chambers.

Fig. 12 is a sectional view on line 12—12 of Fig. 1.

Fig. 13 is a plan view on a reduced scale of the controlling valve and brake casing and showing certain endless connections.

Fig. 14 is a plan sectional view on line 14—14 of Fig. 1, showing how air is delivered to the oil body.

Fig. 15 is a detail view of an adjustment connection.

Like characters of reference designate similar parts throughout the different figures of the drawings.

In the accompanying drawings I have illustrated the most preferred form of the invention which includes a housing composed of upper and lower sections 1 and 2, respectively, which juncture on a substantially horizontal line 3, said sections being suitably bolted or otherwise secured together. The particular manner and means of mounting the housing on a vehicle will be shown and claimed in a separate application, but the apparatus is designed to be mounted in such a manner that shaft 4, which will be later described, may be connected to be driven from the engine of the vehicle in any desired manner. At opposite ends of the housing are openings 5 in which supporting bearings 6 are suitably secured by bolts 7, the latter extending through flanges 8, formed on said bearings. On their outer ends, said bearings are provided with bosses 9, within each of which is disposed a throw ring as indicated at 10.

The bosses 9 are also provided on their interiors with annular recesses 11, adapted to catch any oil that may work outwardly endwise of the shaft 4, and which may be termed oil recovery channels. Hubs 12, of universal joints (not shown) are rigidly secured to the ends of shaft 4, and coact with the throw rings 10, to close the space between said bosses 9. These universal joints, of which only the hubs are shown, serve as a means for connecting the shaft 4 with the drive shaft of the vehicle, as will be shown and described in a pending case.

Hanger collars 12' are fitted to the bosses 9 and having supporting extensions 13 for connection to the truck frame for supporting the brake apparatus.

It will thus be seen that the brake apparatus is supported at opposite points of suspension and concentrically with respect to shaft 4

What I will term the brake casing, which will be later described in detail, is mounted inside the housing, and includes casing sides 14, having supporting sleeves 15, which internally telescope bearings 6, as shown in Fig. 2, and are suitably shouldered at 16, to center the brake casing in the housing. It will now be clear that the brake casing is supported by bearings 6, which, broadly speaking, constitute a structural part of the housing. I have shown anti-friction bearings 17 interposed between the shaft 4 and sleeves 15, which serve to journal the shaft 4, nearest the gears (to be later described) in the brake casing. However, I have also shown anti-friction bearings 18 interposed between bearings 6 and the shaft 4, which function to journal said shaft in the housing. A spacing sleeve 19, is interposed between the bearings 17 and 18 and soft metal or felt rings 20, are interposed between the ends of sleeve 15 and bearing 18. Retaining nuts 21, serve to hold the assemblage in the abutting relation shown.

Thus it will be clear that there is an interrelation of stresses between the rotating shaft 4 and the housing, and said shaft and brake casing. However, as regards the brake casing, it will now be clear that this is supportingly mounted on the housing, in which it is disposed, and that this mounting is at relatively widely spaced points, namely, bearings 6.

However, it will be clear that these alined mountings of the brake casing on bearings 6, would, if other provision were not made, permit the upper portion of the brake casing to tilt to the right or left of Fig. 1. I will therefore point out a third mounting engagement that effectively prevents such tilting movement but which is not otherwise, strictly speaking, a mounting, but rather a retaining connection.

In addition to the sides 14, the brake casing also includes a peripheral casing section which for the purpose of the present description will be generally indicated at 21. On its upper end, said section 21 is provided with a retaining lug 22, adapted to project into a retaining recess 23, formed in the upper section 1, of the housing. In actual construction, this recess 23, is formed by depending flanges 24, as shown in Fig. 2.

At this point it may be informative to state that the entire housing could tilt in the suspension or hanger collars 12', to the right or left of Fig. 1, about the axis of shaft 4, as a center. However, at the top of the housing I provide a lug 1' which is engaged by a stabilizer 12" which is a part of the suspension frame to be described in my pending case.

In the upper section 1, of the housing, I provide an opening 25, which is an air egress for the housing, the purpose and function of which will later appear.

The oil recovery chambers 11, are shown provided with discharge ports 26, and I connect said ports with pipes 27, which deliver to a discharge pipe 28, that extends through the housing at the left of Fig. 2. This oil recovery discharge pipe delivers to a portion of the apparatus which may properly be described before entering into a description of the brake mechanism.

This hydraulic brake, as is usual, employs a liquid upon which braking stress is imposed to transmit braking resistance against travel of the vehicle and reference will hereinafter be made to such liquid as "oil" by reason of its obvious advantages. However, in any event, I never use the term "oil" as an operative essential and wherever that term is used, I employ it in the generic sense which the term "liquid" would be understood.

It is a feature of this invention to employ fresh air as a cooling medium and I will next describe the novel relation of the initial air intake, to the oil recovery feature to which I have just referred.

A combined air intake and oil filling vessel is indicated at 29 and the same, as regards its lower end 30, will preferably be disposed at a lower elevation than the pipe 28, from which recovery oil flows into said vessel by gravity. Said vessel will also be located in such relation to the truck as to be easily accessible for oil filling purposes, the same having a filling cap 31. The lower end 30, has a residue trap which may be in the form of a plug 32, adapted to have threaded connection with said lower end of said vessel and being provided with a stem 33. This stem 33 is equipped with a disc head 34 which is in such peripheral spaced relation to bore 35 as to permit oil residue to descend into the resulting pocket 36, and be removed when the plug 32 is unscrewed. The pipe 28, opens to said vessel 29 at 37, to deliver recovery oil thereto from the chambers 11.

An air supply pipe 38, opens at 39, to the lower end of vessel 29, and extends upwardly toward and is connected with the air intake of the brake mechanism, as will later appear. The initial air intake pipe is indicated at 40, the same opening to vessel 29 at 41, and having an intake end 42, disposed in the top of the cab 43 of the truck, or in any position in a closed or open car where it is least liable to draw in foreign matter, such as dust and dirt. Any desirable provision for screening or filtering such air may be employed as may be within the skill of that art, which is no part of this case.

Reference will next be made to the brake casing and the mechanism therein.

As previously stated, said casing consists of side sections 14, and a peripheral section 21, which are shown bolted together by bolts 44. Said casing is shaped to form superposed gear chambers 45 and 46, in the former of which is disposed a gear 47, which, in this construction, is an idle gear, the same having teeth indicated at 48. In the latter chamber 46, is disposed a gear 49, having teeth 50, and the teeth of both gears are in meshed relation as shown. Gear 47 is mounted on shaft 51, and is preferably keyed thereto, as indicated at 52. The ends of shaft 51 are journalled in anti-friction bearings 53 interposed between said shaft 51 and protuberent hollow bosses 54, with which the side sections 14 are provided. Retaining nuts 55, serve to hold the bearings 53 in position.

Gear 49 is mounted on the vehicle driven shaft 4, and keyed thereto as shown at 56. Interposed between the periphery of gear 47, and the wall of chamber 45, is a hardened wearing sleeve 57, and a like sleeve 58, is provided in chamber 46. The teeth of gears 47 and 49 pass in very close relation to said sleeves with a working clearance in practice of from four to seven thousandths of an inch, for example. Laterally of said gears, I provide hardened wearing plates 59 and 60, as clearly shown in Fig. 2.

At points opposite the mesh engagement of the gears 47 and 49, are opposed pressure chambers which I will designate at A and B, and which, as clearly shown in Fig. 1, open to the faces of the gears 47 and 49, the full width of said faces. I have indicated at $a$ and $b$ the contour of the chamber walls that lead toward the faces of the gears and form with them, an air or oil path, as the case may be. However, each entire chamber will hereinafter be considered as an entity, and will be referred to as either chamber A or B. The full line arrows in Fig. 1, show the direction of rotation of the vehicle driven gears when the vehicle is moving forwardly, and the dotted line arrows show the direction of gear rotation when the vehicle is moving backwardly. Further, when looking at Fig. 1, the view of the reader of the drawing will be considered as though looking toward the engine of the automobile or forwardly of the vehicle, the brake being disposed transversely of the longitudinal axis of the latter.

At this point it may be stated that the teeth of the gears 47 and 49, together with their respective wearing sleeves 57 and 58, form what I will term buckets, and in forward rotation, as indicated by full line arrows, the buckets would carry air or oil from chamber A, to chamber B. In backward movement of the vehicle, these buckets would carry air or oil from chamber B to chamber A. Thus, chamber B, would be the filling or pressure generating chamber in which oil would be congested to brake against forward movement, and chamber A would be the supplying chamber. On braking against backward movement of the vehicle, chamber A would be the filling or pressure generating chamber in which oil would be congested, and chamber B would be the supply chamber.

I will next describe a novel feature consisting in means for balancing the gears 47 and 49 in an equilibrium of pressure. It may be informative to state that congestion of oil in either chamber A or B, under extreme loads, may reach a pressure of sixteen thousand pounds total. There will be about eight square inches for each gear, and as both gears are exposed to each chamber, there would be a total of sixteen square inches exposed, and considering this total area, there might be a maximum total pressure of about sixteen thousand pounds. In prior constructions this pressure has been sufficient to actually shift the gears so that peripheral tooth portions diametrically opposite the congesting chamber would rub against the brake casing with such force as to heat and soften the metal thereof at such points. Such heating and friction would of course weaken the metal at such points. In other words, a condition resulted wherein the normal bursting stresses that the metal would otherwise withstand, became bursting strains that the casing was unable to stand.

In addition to the bursting tendency, the gear teeth or the casing, or both, by reason of excessive wear, soon increased the clearance between the two to such an extent that leakage resulted thereby causing inefficient operation. Further, when gears are shifted apart and fail to mesh on the pitch line, the teeth not only wear but also rattle, and bearings also become faulty from wear.

The only way known to applicant and others, prior to this invention, for overcoming the foregoing difficulties was to so greatly increase the mass of metal for strength purposes as to overcome this bursting tendency, but such an expedient resulted in a structure far too heavy and bulky to be practical.

I will now describe the manner and means for overcoming these difficulties, reference being made to Figs. 1, 2, 11 and 12.

Referring more particularly to Fig. 1, the section 21, of the brake casing, in gear chamber 45, has a balancing chamber A' which opens to the gear face and which is companion to and diametrically opposite pressure chamber A, as regards gear 47. Likewise, chamber 46 has a balancing chamber A² which is also companion to and diametrically opposite pressure chamber A, as regards gear 49. Chamber 45 has a balancing chamber B' which is companion to and diametrically opposite pressure chamber B, as regards gear 47. Chamber 46 has a balancing chamber B² which is companion to pressure chamber B, and which is diametrically opposite thereto as regards gear 49. Each chamber has an elongated terminal, as indicated at 61 to 64, which extend circumferentially of the gear faces sufficiently so that at least two gear pockets will always be exposed to each chamber. It will be noted that these terminals are not only very shallow, but that they preferably also extend laterally of the gear faces, as shown in Fig. 12, to afford good pressure egress toward the gear faces.

As will be seen both in Figs. 1 and 12, the shallow terminals communicate with a relatively restricted neck 61', which leads to the passage 62', this construction being the same in all four balancing chambers. Thus, while oil under pressure has good spreading ingress toward the gear faces, this construction, with its various restrictions, will prevent effective centrifugal discharge of oil from the gear pockets outwardly into said chambers as the oil will crowd in its efforts to get past the shallow terminals and would meet an arresting restriction in the contracted neck, in addition to the resistance of the right angle between the neck 61' and the passage 62'.

In one end wall of pressure chamber A, is a terminal connection 65, and in Fig. 11, I have shown a pipe 66 connected with said terminal and opening to one end of balancing chamber A'. A pipe 67, also connects with terminal 65 and opens to one end of balancing chamber A². Thus, whenever there is any congestion in chamber A, there will be an equal amount in the balancing chambers A' and A², hence both gears 47 and 49 will be in an equilibrium of pressure offsetting what would otherwise be a disrupting or displacing pressure in chamber A.

I also provide chamber B with a terminal 68, and a pipe 69 connects terminal 68 with balancing chamber B', while a pipe 70, connects terminal 68 with balancing chamber B².

It will now be clear that opposing balancing chambers will always have the same pressure therein as their companion pressure chamber, irrespective of pressure variation in the latter, and irrespective of the direction of movement of the vehicle.

If for any reason the tooth buckets failed completely to be filled, while passing the generating chamber, such partially filled buckets would inevitably be completely filled in passing the acting balancing chambers, hence, the latter perform a dual function.

I have indicated the oil level at approximately on a horizontal line intersecting the axis of rotation of shaft 51, hence, after a few revolutions of the gears 47 and 49, there could not be any air in the tooth pockets, as will be more fully described in the operation of the device.

Reference will next be made to my improved controlling valve.

As shown in Fig. 1, said valve includes a valve casing 71 which may be secured to the brake casing at 72. Said casing 71 is open at both ends and is equipped with a wearing take-up sleeve 73, the interior of which is tapered as shown at 74, and of course said sleeve 73 is suitably fixed in said casing 71. A tapered valve closure 75 is rotatable in sleeve 73 and is provided with oppositely disposed take-up adjustments. One of said adjustments consists of a screw 76 adapted to abut against the brake casing at 77, and having a lock nut 78. This may be termed the secondary take-up.

Reference will next be made to a primary take-up which is disposed at that end opposite the end equipped with the secondary take-up, the primary take-up being accessible from the exterior of the mechanism.

The housing has an opening 79, shown in Fig. 1, in which is removably disposed a bearing 80, having a flange 81, secured to the housing by bolts 82. A valve closure operating member, which is shown in the form of a sleeve 83, is rotatably mounted in bearing 80, and is provided with a disc extension 84, disposed in abutting relation against the outer end of bearing 80. This extension is also provided with an operating arm 85 which is adapted to be connected with the brake treadle (not shown) and which is located as usual at the foot board of the automobile. A coil spring 86 has one end anchored at 87, to the bearing 80, and its remaining end is anchored at 88, to disc 84, and the arrangement is such that this spring will normally return the valve closure 75 to a non-braking air adjustment, as will later appear. Said sleeve 83 is non-rotatively connected with the valve closure 75, and in the present construction, and as shown in Figs. 1 and 15, said connection is formed by a key collar 89, which has a key connection 90, with closure 75, and a key connection 91, with sleeve 83. This type of connection readily compensates for slight dis-alignment of the parts and always preserves a non-rotatable connection therebetween.

A cap bearing is indicated at 92 and is secured to bearing 80, at 93, and is provided with an opening 94, through which arm 85 extends. Said opening 94 also has stop walls, one of which is indicated at 95, to limit oscillating movement of arm 85, as will now be clear. A flange portion 96, of cap 92, forms an outward abutment for flange 84, and a hub 97 forms an outer bearing for sleeve 83. A primary take-up screw 98 has threaded connection with hub 97 and extends through sleeve 83 into contact with closure 75, as indicated at 99.

It will now be clear that opposed take-ups are provided axially of closure 75 and that the key collar will maintain nonrotatable connection not only as regards slight dis-alinement but will also maintain such connection in view of take-up adjustment, for a relatively wide range thereof.

It will be clear by viewing Fig. 1, that the brake casing is mounted on the housing, as previously described, and that the controlling valve is mounted on the brake casing at a point somewhat remote from the mounting of the brake casing in the housing. Further, the operating means for the valve closure is journalled in the housing at a still further remote point. Therefore, the advantage of the compensating, and in fact flexible non-rotative connection, will now be clear as relative vibration of the housing with respect to the brake casing and the lateral disposition of the valve with respect to the brake casing, would relatively increase the extent of vibrating movement of these remote parts.

I will now revert to the controlling valve and complete the description thereof.

It may be preferably informative to state that my improved controlling valve has one port assemblage that positively controls both ingress and egress of air, and that it has another port assemblage that positively controls both ingress and egress of oil, and that said valve is embodied in one integral and unitary structure having only one operative connection for the performance of each and all of its varied and multiple functions.

I will first describe the air connections and the paths that the air negotiates, and it will be understood that in all adjustments with air ingress, there will be a total absence of braking functions.

Referring to Fig. 2, the air pipe 38 is connected with fresh air ingress 100 which is disposed in a pipe 101, that is suitably fixed to valve casing 71, and which rises through air egress opening 25, in the housing. Pipe 101 extends through said opening 25 in considerably spaced relation thereto and is advisedly equipped with an overhanging flange 102 to protect said opening. In practice, said opening 25 will be closed by a suitable filter body which it is not necessary to show. Disposed in said pipe 101 is a non-return check valve 103, which the ingressing air unseats against a light spring 104, that normally seats said valve 103. Said valve 103 prevents residue oil, discharged from the brake casing, from flowing out through the air ingress pipe 101, as will later appear. Said pipe 101 has a branch 105, disposed preferably above the oil level, and which is provided with an outwardly opening check valve 106, which is normally held sealed by a light spring 107. This valve 106 checks ingress of both air and oil from the interior of the housing into the air pipe 101, but permits egress of residue oil from the brake casing back into the interior of the housing where such oil descends into the oil body forming the normal supply. Valve 106 will not open when air is ingressing through pipe 101, by reason of the fact that such air is drawn in by suction, as will later appear, which would tend to close rather than open said valve 106.

The air ingress to valve casing 71, which will always be assumed to be a part of the sleeve 73, is indicated at 108 and is adapted to register with closure port 109, having a radial branch 109'. The casing 71 is provided with, preferably an endless connection with the brake casing, which consists of pipes 110, more particularly shown in Fig. 13, and pipes 110 deliver or open to the ends of pressure chamber A. When the vehicle is moving forwardly, as shown by full line arrows, the gears 47 and 49 will pump or force the air from chamber A to chamber B, hence all the air that enters at 100, will be drawn in by suction to satisfy the gears and prevent the formation of a vacuum, which latter would result in a drag on the gears. Of course this air will enter the balancing chambers, previously described, but in the absence of any appreciable pressure.

Chamber B, is connected, preferably by two pipes 111 with the oil portion of the controlling valve, as shown in Figs. 7 to 10. The closure 75 has a port 112 that is adapted simultaneous to register with pipes 11, as shown in Fig. 8. A radial or passage port 113 leads from port 112 to the periphery of closure 75 and is adapted to register with a port 114 in the casing 71. This port 114 has a substantially horizontally disposed terminal 115 which is not only disposed below the oil level but is laterally extended as shown in Fig. 14, so that as the air discharges therefrom, it functions to whirl the oil body in the housing with a result that practically all the oil is brought into contact with the air. As the air discharged from terminal 115 rises to the surface of the oil body, it enters the upper portion of the housing and is free to egress through opening 25 into the outer air.

The foregoing air or non-braking adjustment, of the controlling valve is always the starting position, and also what might be termed the normal position, as this position is the one always occupied when no braking function is being performed, regardless of travel direction, and further, this is the position to which the spring 86 always automatically restores the valve from any other position, as soon as the driver releases the foot pedal.

Reference will next be made to the manner in which oil is controlled by the controlling valve.

The casing 71, is provided with an oil ingress passage which is shown at 116 and which extends downwardly in the oil reservoir of the housing to a point very near the bottom thereof. Thus, if the commingling of air and oil results in foaming the oil, or air bubbles, such formation will occur if at all, at some elevation above the terminal 117 of the oil ingress pipe. In practice, I prefer to round the inner edge of the terminal 117, as clearly shown in Fig. 1, to facilitate entrance of the oil therein. The casing sleeve 73, is provided with a port 118 in permanent registry with pipe 116 and the closure 75 closes said port, and thereby prevents oil ingress, in the non-braking or air adjustment shown in Figs. 1, 3 and 4. Thus, the gears are free from oil drag when no braking function is being performed. However, when the closure 75 progressively reaches the Fig. 5, position, then oil can enter 118, and the port 109, and pass laterally into pipes 110 simultaneously into both ends of pressure chamber A. The gears 47 and 49 will then carry the oil around and over to pressure chamber B, from whence the oil will return through pipes 111 to port 112, and pass through port 113, down through egress 114, and out through terminal 115, into the oil body.

I have now briefly traced the air and oil paths sufficiently to make the structural portions clear, and preliminary to a description of the operation, in which latter, I will specifically trace the operations step by step under all conditions.

At this point it may be desirable to point out that while it has been stated that I have an assemblage of ports for air and an assemblage of ports for oil, in said controlling valve, it will now be clear that this applies to the particular adjustment of the valve and that I do not mean to say that I have an entirely separate assemblage of ports for each of these agencies.

I will next describe the operation of my improved brake.

When the brake is initially installed, or when a change of oil is made, drainage will be made at X and filling at Y. However, when the oil is to be slightly replenished by adding a cup or so, then filling will be effected through cap 31, of the filling vessel 29. For purposes of illustration, it will be assumed that vessel 29 has just been partially or completely filled to replenish the oil supply, and that the vehicle is moving forwardly with the controlling valve in the non-braking air adjustment shown in Figs. 1 and 3, whereupon, suction of the gears 47 and 49 will draw the oil upwardly through pipe 38, into pipe 101 and through the controlling valve and pipes 110, into chamber A. The gears will transfer this oil from chamber A to chamber B, and it will be forced back through pipes 111 to the controlling valve and from port 113, this oil will be discharged through terminal 115 into the housing reservoir. It would only require a very few revolutions of gears 47 and 49 to make this transfer and the following air intrained would force the replenishing oil through the path just described. As the oil was withdrawn from vessel 29, the latter would be filled with air through pipe 40. I advisedly dispose terminal 39 above the bottom of vessel 29 so that oil below said terminal will not be withdrawn and sediment can quiescently collect therein.

The vessel 29 will of course be located at such an elevation that recovered oil from pipe 28 will flow into said vessel by gravity.

Normally, vessel 29 will be empty above terminal 39 and air from the outer atmosphere will be drawn through said vessel and positively advanced by the gears down into the oil body and out through egress 25, as hereinbefore explained, on forward movement of the vehicle. Thus this outside air, which is always fresh air, will act not only as a cooling medium for the gears, and also the oil, but it satisfies suction of the gears so that vacuums are avoided, and the drag consequent thereto.

With the controlling valve in the non-braking air adjustment shown in Fig. 1, any backward movement of the vehicle would cause the gears 47 and 49 to rotate in the direction of the dotted line arrows in which event chamber A would be the filling chamber and chamber B the emptying chamber. As suction in chamber B could not be satisfied with air, by reason of the fact that chamber B is not connected with the air intake, the chamber B would have drawn into it the oil from the oil body. Such suction in chamber B, would induce a flow of oil upwardly through 114 to port 113 and thence through port 112 into pipes 111 and then into chamber B. From chamber B, such oil would be transferred by the gears 47 and 49 to chamber A, and through pipes 110 to ports 109, 109' and upwardly in pipe 101. As valve 103 is a check valve against egress through pipe 110, such oil would open valve 106 and be discharged back into the housing, allowing free backward non-braking movement. As vehicles are backed up only slight distances, such drag as the oil might impose during such reverse movement of the car, which is almost always at a slow rate of speed, would be nugatory.

At this point it is desired to emphasize the advantage of having the gears flooded with oil when the vehicle is backing up with the controlling valve in the air ingress position of Fig. 1. It will be clear that in this flooded condition, the gears would instantly act upon oil to build up a braking pressure just as soon as the controlling valve was adjusted for that purpose, and there would be not the slightest pause waiting for the gears to draw in oil.

On again proceeding in a forward direction, with the controlling valve in the same position as shown in Fig. 1, the oil in the brake casing and controlling valve would be expelled with a very few revolutions of the gears, as has been heretofore explained.

In all the foregoing descriptions of operation, it has been assumed that the controlling valve was in the Fig. 1, position. I will next describe the operation when brakeage is applied against forward movement of the vehicle.

Assuming that the car was travelling forwardly with the controlling valve in the Fig. 1, position, and the driver desired to apply brakeage, he would first move valve 75 from the Fig. 3, position in a contra-clockwise direction viewing that figure, and air ingress port 108 would first be closed, as shown in Fig. 4, but pipes 110 would still be fully open although no air could now enter the controlling valve.

Note the fact that with the controlling valve in the Fig. 4, position, not only is air ingress shut off, but oil ingress through 118 is also shut off. Thus, at this adjustment period, the gears are building up a vacuum in chamber A and the connections back to the controlling valve. If this adjustment were maintained, there would of course be an application of brakeage as a result of this vacuum but this particular adjustment will only be momentary and its real importance will be more fully described in rearward brakeage, later on. It may be stated that on the oil side of the controlling valve, in the Fig. 8 position, which is the companion view to Fig. 4, there is full portage registry for egress from chamber B, which of course cannot take place because of shut-off of air ingress to chamber A.

Of course it will be understood that I am describing a slow step by step operation of the controlling valve, whereas it might be very rapidly operated although in any event, it would have successively to attain the various positions about to be described irrespective of the speed at which it was operated.

In Fig. 5, and its companion view Fig. 9, I have shown the controlling valve progressively advanced to the point where, with air ingress still shut off, the port 118 is opened for the oil to flow upwardly into port 109 and outward through pipes 110 to chamber A, with little or no restriction. The gears, operating in the direction of the full line arrows, would transfer the oil from chamber A to chamber B, and because the ports 112 and 113 in Fig. 9, are partially out of registry with return pipes 111 and pipe 114, respectively, the oil could not egress from chamber B as rapidly as it entered, pressure in said chamber B would be generated and initial brakeage against forward movement would be applied. In fact, this is practically the initial position of the controlling valve when brakeage is beginning to be applied.

As the controlling valve is progressively advanced from companion Fig. 5 and 9 positions, toward the Fig. 6 and 10 positions, effective and controlling brakeage will come into play and in the latter positions, full brakeage will have been attained. No oil can egress from chamber B, when the ports are in the Fig. 10 position. However, in Fig. 6, it will be noted that port 118 is practically fully open for oil ingress and pipes 110 are likewise practically fully open and hence, practically full oil ingress is afforded to chamber A.

Of course a suitable oil relief device will be utilized so that if the controlling valve were suddenly shifted to the Fig. 10 position, the resulting pressure strain would be relieved from the brake casing. Broadly, this is old, but in a subsequent case, I will present a specific form of such relief device.

Now it will be assumed that the vehicle has been brought to a position of rest and hence, if the driver wishes to continue to proceed in a forward direction, he will release the brake pedal and spring 86 will restore valve 75 to the Figs. 3 and 7 position. This will shut off ingress of oil through passage 116 and open ingress of air through 108, whereupon the gears will again be satisfied with air, and the oil in the brake casing will be forced by the air, which is now being propelled by the gears, back into the housing, from chamber B, to pipes 111, ports 112 and 113 and terminal 114.

I have described the operation when the vehicle was advancing, and with the controlling valve in the air or non-braking adjustment, and also, in a braking adjustment. I have also described the operation when the vehicle is backing up with the controlling valve in the non-braking or air adjustment. I will next describe the operation of applying brakeage to the vehicle against backing up movement of the latter.

Assuming that the controlling valve 75 is in the air or non-braking adjustment shown in Fig. 1, with the vehicle backing up, and the gears 47 and 49 rotating in the direction of the dotted line arrows, then, the chamber A, would be the filling chamber, and chamber B, the emptying chamber. If the driver wished to apply brakeage, he would advance the controlling valve toward the Fig. 5 position, but as before stated, in backing up prior to brakeage application, and with air ingress open, as in Fig. 3, the gears would be flooded. Thus, the gears would be in an advantageous relation to the oil to very quickly build up a braking pressure. Assuming that the valve was advanced from the Fig. 3 to the Fig. 4 position, air ingress would be shut off and the oil coming into port 109, through pipes 110, could not find egress up through port 108, because that is closed. The oil could not egress down through 116, because that is also closed. Thus, it will be clear that in applying brakeage against backward movement, the Fig. 4 position, would be that position in which the most extreme brakeage is effected. However, there is a period between the Fig. 3 and Fig. 4 positions where less than full brakeage would be applied against backing up movement. When the controlling valve is advanced to a position with the port 108 half way closed, then oil congested in chamber A would have a restricted passage up through port 109', and 108 and out through valve 106. Therefore, only a very slight movement is necessary to apply brakeage against rearward vehicular movement. While the controlling valve is advancing toward the Fig. 4 position, the ports 112 would be in open registry with pipes 11, as in Fig. 7, and this open registry would be maintained when the valve reached the Fig. 8 position, which is a companion position to the Fig. 4 position. Hence, it will be seen that there would be no restriction of oil ingress toward chamber B.

Now assuming that brakeage applied against rearward movement of the vehicle had brought the latter to a position of rest, then the driver could either release the brake pedal so that the controlling valve would be restored to the Fig. 3 position, or if he advanced the controlling valve to the Fig. 5 or Fig. 6 positions, he would thereby release brakeage against backward vehicular movement. This is true by reason of the fact that movement of the controlling valve to either the Fig. 5 or 6 position, would open egress for oil out through pipe 116 and thence down into the oil body. Hence, in this single adjustment instance, the pipe 116 would be an oil egress pipe, but in no other instance.

No harm would result if the driver, in releasing brakeage against rearward vehicular movement, advanced the controlling valve to either the Fig. 5 or Fig. 6 positions, or any positions intermediate thereto. It would be an unnecessary adjustment and a practiced driver probably would seldom make it.

After the controlling valve had been restored to the Fig. 3 position, the vehicle would be free to advance or back up. If the vehicle was backed up, the gears 47 and 49 would rotate in the direction of the dotted arrows and draw oil by suction up through 114, ports 113 and 112 and through pipes 111 to chamber B, and the oil would be transferred over to chamber A. The oil would be discharged out through port 109' and valve 106, as previously described. If the vehicle was advanced forwardly, the oil would be expressed and air would take its place in the gear path, as previously described.

It will now be clear that whenever brakeage is applied against either direction of vehicular travel, the controlling valve will always be advanced in one direction, which, viewing Fig. 3, is a contra-clockwise direction. To restore the controlling valve to a non-braking or air adjustment, the valve will always be moved in a clockwise direction, viewing Fig. 3, in this particular embodiment.

I will next describe the operation of my improved counter-balancing means and method.

It will be understood from the previous description, that while pressure is being built up in chamber B, for brakeage against forward vehicular movement, an equal counter-balancing pressure would be generated in balancing chambers B' and B², to dispose the gears in an equilibrium of pressure and prevent their displacement. This pressure in the balancing chambers B' and B² will be maintained on an equality with the pressure in chamber B, irrespective of variation of pressure in the latter chamber.

When brakeage against forward vehicular movement has been released and the controlling valve restored to the Fig. 1 position, air will enter the brake casing and flow through the same, as previously described and there will be a practical absence of pressure therein. Hence, the oil that filled balancing chamber B' would return by gravity to chamber B and be carried out by the gears 47 and 49, as the air flowed thereby. The oil in the balancing chamber B², and the pipe 70, leading thereto, would flow into the gear chamber containing gear 49 and would be picked up by the teeth thereof and carried into chamber B, from which it would be expressed by the current of air. Thus, even in the lower balancing chamber B² practically all the oil would be ejected.

It will also be clear that when brakeage is applied against rearward vehicular movement, chamber A will be the pressure generating chamber and oil therein will be forced into balancing chambers A' and A² to counter-balance the thrust on gears 47 and 49 from chamber A. Restoration of oil from balancing chambers A' and A² will be made in the same manner as described in connection with chambers B' and B².

It will now be clear that irrespective of the direction of travel of the vehicle, the gears 47 and 49 will always be in an equilibrium of balance, and that neither air or oil can pocket in said chambers or their connections.

While I consider it of great advantage to employ opposing counter-balancing chambers for each of the pressure chambers, still, in some vehicles only one set of balancing chambers may be employed and still be within the province of my invention, preferably, the balancing chambers that would act on the application of brakeage against forward travel.

I will next describe additional functions performed by the balancing chambers.

When the empty teeth of the gears enter a supplying chamber, for example, chamber A, they do not even contain air, as the latter is driven out by the oil, after a few revolutions of the gears. The fact that these empty teeth are in substantial vacuum, and the additional fact that the empty teeth are entering a chamber filled with oil, would in most cases insure complete filling of the teeth as they recede from the chamber. However, at extremely high speeds, the teeth might not be completely filled with oil. In this example taken, where A is the supplying or emptying chamber, B would be the pressure chamber, and if any tooth pockets were not completely filled when leaving chamber A, they would be filled in passing balancing chamber B' and B² as the pressure of oil trying to egress from said balancing chambers would seek admission into such partially filled teeth. Thus the acting balancing chambers perform the dual function of counter-balancing and also filling the gears.

When the teeth arrive abreast of the inactive balancing chamber A' and A² then there would be a tendency for centrifugal action to throw out a certain amount of oil from the tooth pockets. It is roughly estimated that at a speed of two thousand revolutions per minute, of gears 47 and 49, there might be a loss of oil of perhaps five per cent, and at five hundred revolutions, there might be a loss of about one per cent. However, this centrifugal action tendency is counteracted by the fact that vacuum tends to hold the oil in the tooth pockets, and it is also counteracted by the fact that the very shallow terminals 61 to 64, which have a spread far less than the area of the face of the gears, thereby preventing entrance thereto of any appreciable amount of oil. Further, the restricted necks 61' and the rectangular turns the oil would have to take, also militate against loss. It is true that the inactive balancing chambers are always in connection with that pressure chamber which is acting as the suction chamber, which, in this example, is chamber A. However, oil enters said chamber A so freely from pipes 110 as to practically preclude any effective suction influence at the inactive balancing chambers.

It will be understood that when B is the suction chamber and A the pressure chamber, the action of the counter-balancing chambers will be the reverse of that just described.

It will also be clear that the teeth of both gears supply oil to the pressure chamber at such a rapid rate that even if the tooth pockets were not all completely filled after passing the inactive balancing chambers, there would be no loss of efficiency.

It will be noted that except for the various communications established by the controlling valve 75, the brake casing is entirely closed against communication with the housing as regards ingress or egress of either air or oil.

The only air ingress available to the brake casing, is through the controlling valve, and such air ingress must inevitably be from the outer air which is always fresh and unemployed and hence always has a maximum cooling action.

I desired to emphasize the fact that the brake casing always exhausts air into the outer air and hence the device has both an intake and an exhaust from and to the outer air, respectively, in addition to the advantageous arrangement whereby the exhausted air in its path toward the outer air, also exerts a cooling action on the oil body, which I claim both as a mechanism and a method.

I also claim it novel as a method, to peripherally counter-balance gears in a hydraulic brake against disruptive pressure strains from the pressure or generating chamber.

It will be noted that the endless connections between the controlling valve and the pressure chambers always insures easy movement of the controlling valve by reason of the fact that said valve is balanced by opposing pressures.

It is believed that the invention will be fully understood from the foregoing description, and while I have herein shown and described one specific form of my invention, I do not wish to be limited thereto except for such limitations as the claims may impart.

I claim:

1. A vehicular hydraulic brake including a housing adapted to contain a body of oil and having an air egress opening to the outer air, a brake casing disposed in said housing and being normally out of communication therewith and having vehicle driven means adapted to act upon said oil to apply brakeage, and valve mechanism for opening air ingress to said brake casing from the outer air and opening air egress from said casing to said housing for propulsion by said vehicle driven means of a continuous fresh stream of air through said brake casing when no braking function is being performed.

2. A vehicular hydraulic brake including a housing adapted to contain a body of oil and having an air egress opening to the outer air, a brake casing disposed in said housing and being normally out of communication therewith and having vehicle driven gears adapted to act upon the oil to apply brakeage, and valve mechanism for opening air ingress to said brake casing from the outer air and opening air egress from said casing into said oil body for propulsion by said vehicle driven gears of a continuous fresh stream of air through said brake casing and oil body when no braking function is being performed.

3. A vehicular hydraulic brake including a housing adapted to contain a body of oil and having an air egress opening to the outer air, a brake casing disposed in said housing and being normally out of communication therewith and having vehicle driven gears adapted to act upon the oil to apply brakeage, and valve mechanism for opening air ingress to said casing from the outer air and opening air egress from said casing laterally into said oil body for propulsion by said gears of a stream of continuously fresh air through said casing and laterally below the surface of said oil body to cause whirling movement of the latter.

4. A vehicular hydraulic brake including a reservoir adapted to contain an oil body and vehicle driven gears adapted to act upon the oil to apply brakeage, and valve means affording passage of continuously fresh air into said oil body when no braking function is being performed to reduce the temperature of said oil body.

5. A vehicular hydraulic brake including opposed pressure chambers and vehicle driven gears for filling either chamber with oil to apply brakeage, and means affording passage of fresh outer air from the exterior of said brake through said chambers and about said gears when no braking function is being performed.

6. A vehicular hydraulic brake having ingress and egress from and to the outer air, respectively and including an oil reservoir and vehicle driven gears adapted to act upon the oil to apply brakeage, and valve means affording passage of a stream of continuously fresh air past said gears and through said oil when no braking function is being performed, whereby the temperature of both the gears and oil will be reduced.

7. A vehicular hydraulic brake including opposed pressure chambers and vehicle driven gears for filling either chamber with oil to apply brakeage, and combined air ingress and egress valve mechanism having a fresh air ingress from the outer air to one of said chambers and an egress from the other of said chambers to the outer air, irrespective of the direction of movement of the vehicle, when no braking function is being performed.

8. A vehicular hydraulic brake including opposed pressure chambers and vehicle driven gears for filling either chamber with oil to apply brakeage, and a combined air ingress and egress valve mechanism having air ingress and egress connections with said chambers from and to the outer air, and one of said connections being an endless connection.

9. A vehicular hydraulic brake including opposed pressure chambers and vehicle driven gears for filling either chamber with oil to apply brakeage, and a combined air ingress and egress valve opening fresh air ingress from the outer air and egress to the outer air to and from said chambers when adjusted into an oil shut-off position.

10. A vehicular hydraulic brake including opposed pressure chambers and vehicle driven gears for filling either chamber, and a combined oil ingress and egress valve having an endless circuit oil ingress connection with one chamber and an endless circuit egress connection with the remaining chamber irrespective of the direction of movement of the vehicle, whereby said valve will be in an equilibrium of balance from oil pressure thereagainst.

11. A vehicular hydraulic brake including opposed pressure chambers and vehicle driven gears for filling either chamber, and a combined air and oil valve mechanism having an endless circuit connection to one of said chambers and an endless circuit connection to the other of said chambers, and means for moving said valve mechanism into a non-brakeage air adjustment to shut off oil and afford a stream of fresh outer air passage through said connections and chamber or moving said mechanism into an oil brakeage adjustment and shutting off air and affording oil flow through said connections to apply brakeage.

12. In a hydraulic brake, a brake casing having opposed pressure chambers and vehicle driven gears having portions of their faces exposed to and congesting oil in one of said chambers dependent upon the direction of movement of the vehicle, and ports conveying congested oil from the filling chamber to diametrically opposite facial portions of the gears to balance the latter in an equilibrium of pressure irrespective of pressure variation in the filling chamber.

13. In a hydraulic brake, a brake casing having opposed pressure chambers and a pair of vehicle driven gears having full width portions of their faces exposed to and congesting oil in one of said chambers dependent upon the direction of movement of the vehicle against which brakeage is applied, each chamber having ports opening to restricted facial portions of each gear diametrically opposite such chamber to balance both gears irrespective of the chamber being filled.

14. In a hydraulic brake, a casing having opposed pressure chambers and vehicle driven gears having portions of their faces exposed to and congesting oil in one of said chambers dependent upon the direction of movement of the vehicle against which brakeage is applied, said casing having a balancing chamber opening to peripheral faces of each gear diametrically opposite each pressure chamber, and sets of ports connecting the ends of said pressure chambers with the ends of companion balancing chambers for balancing the gears in an equilibrium of pressure from the filling pressure chamber.

15. In a hydraulic brake, a casing having a pressure chamber and vehicle driven members having peripheral portions exposed to and adapted to congest oil in said chamber, and said casing having balancing chambers connected with said pressure chamber for conveying oil to opposite peripheral diametrical portions of said gears to balance the latter in an equilibrium of pressure.

16. In a hydraulic brake, a brake casing having opposed pressure chambers and vehicle driven gears adapted to compress oil in either chamber dependent upon the vehicular direction against which brakeage is to be applied, a set of gear balancing chambers connected with each pressure chamber and having restricted shallow terminals opening to limited facial portions of the gears diametrically opposite the companion pressure chamber thereof for exerting a counter-balancing thrust on said gears and the acting balancing chambers serving to completely fill any unfilled tooth buckets, the restricted terminals of the inactive balancing chambers limiting discharge of oil from said teeth.

17. In a hydraulic brake, a member for applying brakeage, a vehicle driven shaft therefor, a housing journalling said shaft, means concentric with said shaft for supporting said housing, means for stabilizing said housing, a brake casing for said member journalled in said housing concentrically about said shaft, and means on said housing for stabilizing said casing.

18. In a hydraulic brake, superposed gears for applying brakeage, a vehicle driven shaft for the lower gear, a housing journalling said shaft in its lower portion, hangers concentric with said shaft for supporting said housing, means connected with the upper portion of said housing for preventing tilting movement of the latter about said shaft, a brake casing for said gears, having its lower portion journalled in said housing concentrically about said shaft, and means connecting the upper portion of said casing with said housing to prevent tilting movement of said casing.

19. In a hydraulic brake, a housing, a brake casing mounted in said housing, a controlling valve mounted on said casing, a valve operating member journalled in said housing, and means maintaining non-rotative connection between said member and valve and compensating for dis-alinement therebetween.

20. A hydraulic brake having vehicle driven means for drawing air therein, a fresh air ingress pipe leading from the outer air to said brake, and an oil replenishing vessel for said brake interposed in said pipe and adapted to receive a supply of oil to be drawn into said brake by said air.

21. A hydraulic brake having vehicle driven means for drawing air therein, a fresh air ingress pipe leading from the outer air to said brake, an oil replenishing vessel for said brake interposed in said pipe and adapted to receive a supply of oil to be drawn into said brake by said air, and means for trapping lubricating oil in said brake and delivering said oil to said vessel.

In witness whereof, I have hereunto affixed my signature.

PAUL R. KAUFFMAN.